United States Patent
Kohler et al.

(10) Patent No.: US 6,774,598 B1
(45) Date of Patent: Aug. 10, 2004

(54) METHOD AND CIRCUITRY FOR PRODUCING NOMINAL POSITION VALUES FOR A CLOSED LOOP POSITION CONTROL OF A NUMERICALLY CONTINUOUS-PATH CONTROLLED MACHINE

(75) Inventors: Frieder Kohler, Lauter (DE); Matthias Fauser, Burgwedel (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/070,907
(22) PCT Filed: Sep. 1, 2000
(86) PCT No.: PCT/EP00/08544
§ 371 (c)(1),
(2), (4) Date: Jun. 26, 2002
(87) PCT Pub. No.: WO01/18622
PCT Pub. Date: Mar. 15, 2001

(30) Foreign Application Priority Data

Sep. 8, 1999 (DE) .......................................... 199 42 805

(51) Int. Cl.$^7$ .............................................. G05B 19/29
(52) U.S. Cl. ...................... 318/600; 318/561; 318/571; 318/615; 700/28; 700/33; 700/80
(58) Field of Search ................................. 318/600, 615, 318/571, 561; 700/28, 33, 80

(56) References Cited

U.S. PATENT DOCUMENTS

| | | | | |
|---|---|---|---|---|
| 3,699,317 A | * | 10/1972 | Middleditch | ................. 700/187 |
| 3,720,814 A | * | 3/1973 | Klein | .............................. 700/9 |
| 4,078,195 A | * | 3/1978 | Mathias et al. | .............. 318/561 |
| 4,214,192 A | | 7/1980 | Bromer et al. | |
| 4,214,864 A | * | 7/1980 | Tabler | ......................... 425/329 |
| 4,603,286 A | | 7/1986 | Sakano | |
| 4,748,578 A | * | 5/1988 | Lagadec et al. | ............. 708/313 |
| 4,791,596 A | * | 12/1988 | Harbich | ....................... 708/319 |
| 4,963,806 A | * | 10/1990 | Shinohara et al. | ........... 318/621 |
| 5,073,748 A | | 12/1991 | Boehm | |
| 5,194,790 A | | 3/1993 | Niimi | |
| 5,212,659 A | * | 5/1993 | Scott et al. | .................. 708/313 |
| 5,303,333 A | * | 4/1994 | Hoos | ........................... 700/245 |
| 5,317,529 A | * | 5/1994 | Teraoka et al. | .............. 708/313 |
| 5,325,247 A | * | 6/1994 | Ehrlich et al. | ............ 360/78.09 |
| 5,381,359 A | * | 1/1995 | Abbott et al. | ................ 708/322 |
| 5,404,418 A | | 4/1995 | Nagano | |
| 5,406,182 A | * | 4/1995 | Iwashita | ...................... 318/560 |
| 5,541,864 A | | 7/1996 | Van Bavel et al. | |
| 5,566,188 A | * | 10/1996 | Robbins et al. | .............. 714/744 |
| 5,710,490 A | | 1/1998 | Choi | |
| 6,341,244 B1 | | 1/2002 | Papiernik | |

FOREIGN PATENT DOCUMENTS

| | | |
|---|---|---|
| DE | 220 730 | 4/1985 |
| DE | 41 08 293 | 10/1991 |
| DE | 43 03 090 | 8/1994 |
| EP | 0 042 202 | 7/1987 |
| EP | 0 419 705 | 4/1991 |
| EP | 0 469 617 | 2/1992 |
| EP | 0 583 478 A1 | 2/1994 |
| EP | 0 596 141 | 5/1994 |
| WO | WO 98/15880 | 4/1998 |

* cited by examiner

*Primary Examiner*—Rita Leykin
(74) *Attorney, Agent, or Firm*—Brinks Hofer Gilson & Lione

(57) ABSTRACT

A method for generating nominal position values for a position control loop of a numerically continuous-path controlled machine. The method includes presetting nominal position values with a defined interpolator clock rate, digitally filtering the preset nominal position values and transmitting the digitally filtered nominal position values to a position control loop, which with them controls motion of a machine on a path curve at a defined position control clock rate. Adjusting the digitally filtering nominal position values as a function of dynamic characteristics of the machine and adjusting an interpolator clock rate as a function of the dynamic characteristics of the machine.

13 Claims, 2 Drawing Sheets

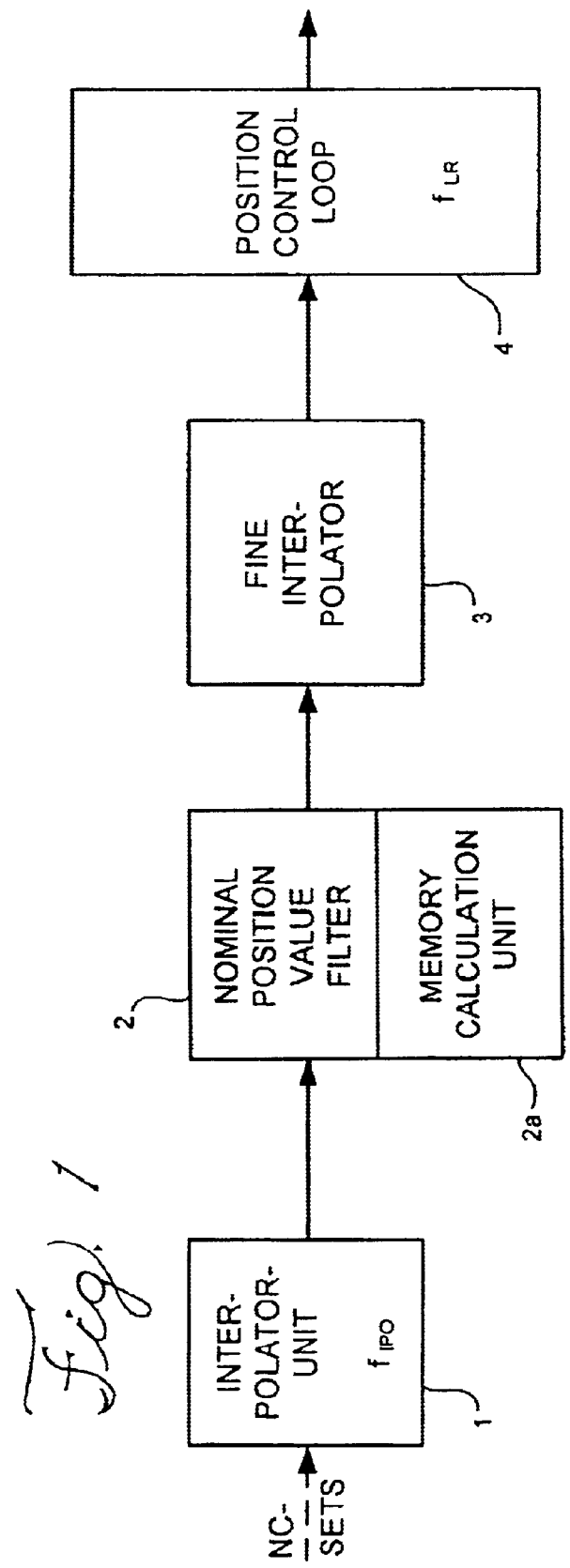

METHOD AND CIRCUITRY FOR PRODUCING NOMINAL POSITION VALUES FOR A CLOSED LOOP POSITION CONTROL OF A NUMERICALLY CONTINUOUS-PATH CONTROLLED MACHINE

Applicants claim, under 35 U.S.C. §§120 and 365, the benefit of priority of the filing date of Sep. 1, 2000 of a Patent Cooperation Treaty patent application, copy attached, Serial Number PCT/EP00/08544, filed on the aforementioned date, the entire contents of which are incorporated herein by reference, wherein Patent Cooperation Treaty patent application Serial Number PCT/EP00/08544 was not published under PCT Article 21(2) in English.

Applicants claim, under 35 U.S.C. §119, the benefit of priority of the filing date of Sep. 8, 1999 of a German patent application, copy attached, Serial Number 199 42 805.0, filed on the aforementioned date, the entire contents of which are incorporated herein by reference.

BACKGROUND OF THE INVENTION

1. Field of the Invention

The present invention relates to a method for generating nominal position values for a position control loop of a numerically continuous-path controlled machine. The subject of the present invention is also a circuit arrangement for generating nominal position values for a position control loop of a numerically continuous-path controlled machine.

2. Description of the Related Art

In numerically continuous-path controlled machine tools or robots, the production of nominal position values is done as nominal value specifications or command variables for the position control loops of the various drive mechanisms, typically in interpolator units located upstream. For that purpose, the desired geometrical axis motion functions and speed profiles are specified to the interpolator units on the input side. On the output side, the interpolator unit furnishes discrete trains of nominal position values or scanned values on a path curve. The nominal position values are output at a defined, typically fixed interpolator clock rate $f_{IPO}$ as command variables to the downstream position control loop. In addition, the nominal position values produced by the interpolator unit, before being transmitted to the position control loop, are also filtered in a nominal position value filter, which as a rule takes the form of digital low-pass filtering. This is done so that the axis drive systems will not induce undesired natural oscillations in the machine, which might lower the quality of the machining.

In conjunction with such variants for generating nominal position values in numerically continuous-path controlled machines, reference may be made for instance to German Patent Disclosure DE 43 03 090 A1.

The filtering in the nominal position value filter is typically designed such that in the spectrum of nominal position values or command variables transmitted to the position control loop, as much as possible no frequencies are located in the range of the resonant frequency $f_{RES}$ of the applicable machine, or in a corresponding resonant frequency band $B_{RES}$. Otherwise, the natural oscillations in the machine axes would result in impaired surface quality of the machined workpiece. By way of a band limitation of the command variables, in the form of low-pass filtration, it is therefore assured that the applicable nominal position value filter will block those components of the frequency that are greater than a suitably selected useful machine frequency $f_N$. The corresponding useful machine frequency $f_N$ of the nominal position value filter is selected as a function of the applicable resonant frequency $f_{RES}$ or resonant frequency band $B_{RES}$.

In the event of especially low resonant frequencies $f_{RES}$, such as $f_{RES} \approx 20$ Hz, however, designing the digital nominal position value filter requires increasing computation effort and expense to achieve the desired filtering action.

SUMMARY AND OBJECTS OF THE INVENTION

It is therefore an object of the present invention to disclose a method and a circuit arrangement for generating nominal position values for a position control loop of a numerically continuous-path controlled machine by way of which, for the most various types of machine and without major effort or expense, path errors that result from induced natural oscillations of the machine can be avoided.

This object is attained by a method for generating nominal position values for a position control loop of a numerically continuous-path controlled machine. The method includes presetting nominal position values with a defined interpolator clock rate, digitally filtering the preset nominal position values and transmitting the digitally filtered nominal position values to a position control loop, which with them controls motion of a machine on a path curve at a defined position control clock rate. Adjusting the digitally filtering nominal position values as a function of dynamic characteristics of the machine and adjusting an interpolator clock rate as a function of the dynamic characteristics of the machine.

This object is also attained by a circuit arrangement for generating nominal position values for a position control loop of a numerically continuous-path controlled machine. The circuit arrangement includes an interpolator unit for presetting nominal position values with a defined interpolator clock rate, a nominal position value filter for digital filtration of the nominal position values preset by the interpolator unit. A position control loop, which processes the digitally filtered nominal position values in such a way that by way of them a motion of a machine on a path curve is controllable at a defined position control clock rate, wherein along with the nominal position value filter, the interpolator clock rate is also adjusted as a function of dynamic characteristics of the machine.

In the present invention, it is now not primarily the nominal position value filter employed that is adapted to the applicable dynamic characteristics of the machine—and in particular its resonant frequency; instead, it is the applicable interpolator clock rate or interpolator clock duration that is adjusted in a targeted way as a function of the dynamic characteristics of the machine, in order to avoid the inducement of undesired natural oscillations. In this way, the computation effort and expense otherwise required for the same filtering action in the nominal position value filter is avoided.

Since the provisions according to the present invention, in the case of low resonant frequencies, essentially represent an increase in the interpolator clock durations or a decrease in the interpolator clock rates, a correspondingly greater computation power for other tasks is now available in the interpolator unit as well. This includes for instance generating nominal position values for still other machine axes, etc.

It also proves advantageous to use a fine interpolator between the nominal position value filter and the position control loop, in the method and circuit arrangement according to the present invention. By way of the fine interpolator, scanned values on the path curve are generated in the time pattern in which the downstream position control loop needs them. It is especially advantageous in this respect that by the fine interpolator, the interpolator clock rate is decoupled from the downstream position control loop, and in particular from the position control clock rate; as a rule, however, there is a fixed ratio between the position control clock rate and the interpolator clock rate.

Further advantages of the present invention will become apparent from the ensuing description of exemplary embodiments in conjunction with the accompanying drawings.

BRIEF DESCRIPTION OF THE DRAWINGS

FIG. 1 is a schematic block circuit diagram of one embodiment of a circuit arrangement in accordance with the present invention;

DESCRIPTION OF THE PREFERRED EMBODIMENT(S) OF THE INVENTION

Figure 2A:
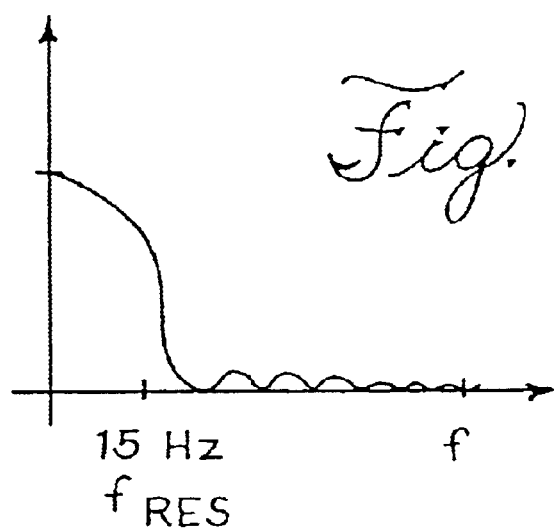
FIGS. 2a, 2b show examples of the pass behavior of digital nominal position value filters with a different number of filter coefficients in accordance with the present invention.

FIG. 1 shows a block circuit diagram of one possible circuit arrangement according to the present invention. In the exemplary embodiment that follows, it will be assumed that the method of the present invention is employed in a numerically continuous-path controlled machine. It is understood, however, that the method of the present invention can also be used in a robot. For simplification, only one axis of the machine will be explained as an example.

The method of the present invention and the circuit arrangement of the present invention are typically intended, however, for all interpolated axes of a machine.

As essential components of the circuit arrangement of the present invention, an interpolator unit 1, a digital nominal position value filter 2, and a position control loop 4 can be listed. As further components of the embodiment shown in FIG. 1, a unit 2a, associated with the nominal position value filter, and a fine interpolator 3 can be mentioned. The unit 2a can be embodied, depending on the version, as either a memory unit or a calculation unit; the specific function of the optional unit 2a and the function of the fine interpolator 3 will be addressed in further detail later herein.

On the input side, the desired geometric axis motion functions of the machine are specified to the interpolator unit 1, for instance in the form of numerical control (NC) sets. On the basis of the input information, the interpolator unit 1 produces nominal position values for the applicable machine axis, which are transmitted to the downstream nominal position value filter 2 at a defined interpolator clock rate $f_{IPO}$ or interpolator clock duration $T_{IPO}$.

In the nominal position value filter 2, the nominal position values preset by the interpolator unit 1 are then subjected to digital filtering in a known manner. The nominal position value filter 2 is preferably embodied as a FIR filter and has an order between 5 and 1024. By way of the filtering, the intent is in particular to prevent frequency components in the range of the resonant frequency $f_{RES}$ of the applicable machine from being included in the spectrum of nominal position values or command variables transmitted to the position control loop 4; such components would generate undesired natural oscillations in the machine. For band limitation of the command variable including the nominal position value, a low-pass filtering is preferably performed in the nominal position value filter 2. This means that all the signal components that are greater than or equal to a useful machine frequency $f_N$, which is derived from the lowest machine-specific resonant frequency $f_{RES}$, or from the associated machine-specific resonant frequency band $f_{RES}$. In practice, the useful machine frequency $f_N$ is selected as half of the lowest resonant frequency, for instance, or in other words $f_N \approx \frac{1}{2} f_{RES}$.

Figure 2B:
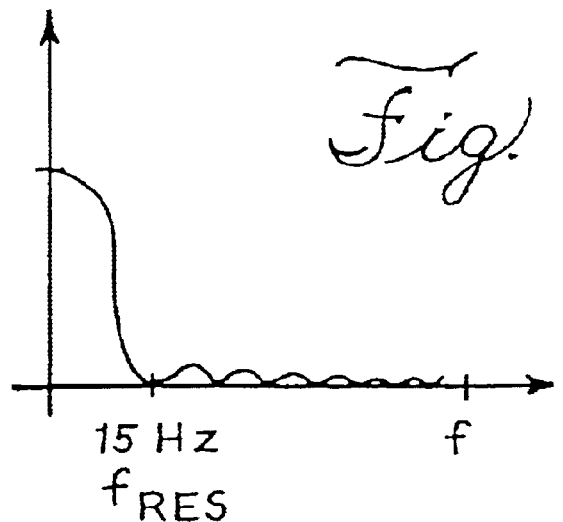

In both FIGS. 2a and 2b, the pass behavior of two digital nominal position value filters is shown which act as a low-pass filter beyond the useful machine frequency $f_N=15$ Hz and thus blocks higher frequencies. The two nominal position value filters differ in terms of the number $n_{Koeff}$ of filter coefficients; hence the nominal position value filter belonging to FIG. 2a includes a total of $n_{Koeff}=32$ filter coefficients, while the nominal position value filter belonging to FIG. 2b has $n_{Koeff}=64$ filter coefficients. From the comparison of FIG. 2a and FIG. 2b, it is quite clear that the nominal position value filter having the larger number $n_{Koeff}=64$ filter coefficients has better filtering action beyond the useful machine frequency $f_N$.

The filtered nominal position values, after suitable further processing in the position control loop 4, finally provide a slightly modified path curve, which is rounded somewhat at places that have major curvatures, such as corners.

By way of the position control loop 4, the control of the motion on a path curve is done in a known manner, on the basis of the command variables or nominal position values transmitted at the input side, at a defined position control clock rate $f_{LR}$ or position control clock duration $T_{LR}$. A typical position control clock rate is approximately $f_{LR}=2$ kHz, and the associated position control clock duration is $T_{LR}=500$ µS.

According to the present invention, along with or as a supplement to the nominal position value filter 2, the interpolator clock rate $f_{IPO}$ or the interpolator clock duration $T_{IPO}$ is now set as a function of the dynamic characteristics of the machine, in such a way that no natural oscillations of the machine are induced by the command variables or nominal position values transmitted to the position control loop 4. The appropriate procedure according to the present invention will now be explained in terms of a simple example.

Once again, a useful machine frequency $f_N=15$ Hz of the applicable machine is assumed. The position control clock duration is $T_{LR}=500$ µs. In the typical procedure in the prior art, an interpolator clock duration of $T_{IPO}=3$ ms is also assumed to be provided. To assure that in the spectrum of nominal position values transmitted to the position controller 4, no frequency components greater than or equal to $f_N=15$ Hz will be included, a digital nominal position value filter 2 with 64 filter coefficients is used, which blocks beyond the useful machine frequency $f_N=15$ Hz. As was apparent from FIGS. 2a and 2b discussed above, to attain an adequate filtering action, $n_{Koeff}=64$ filter coefficients is needed in order to assure the appropriate steepness of the pass characteristic in the range of the useful machine frequency $f_N$. By way of the appropriate nominal position value filter, filtering or averaging is accordingly done over a filtering time interval $T_F=T_{IPO}*n_{Koeff}=3$ ms*64 =192 ms. For filtering over this filtering time interval $T_F$, a filtering calculation time $t_{Cal}=200$ µs is needed.

According to the invention, it has now been recognized that the same filtering action can also be attained with a markedly less expensive nominal position value filter. To that end, a nominal position value filter with a number of $n_{Koeff}=32$ filter coefficients is used, but at the same time the interpolator clock duration $T_{IPO}$ is increased to $T_{IPO}=6$ ms. Since only 32 filter coefficients of the nominal position value filter have to be calculated, the required filtering calculation time $t_{cal}$ needed for the purpose is reduced or halved to $t_{cal}=100$ µs. Hence in this case, with a total of only 32 filter coefficients and correspondingly less calculation effort and expense, the same filtering action can be attained (see FIG. 2b) as before with a total of 64 filter coefficients. In the final analysis, this is achieved because along with the nominal position value filter, the interpolator clock rate, $T_{IPO}$ is also set in a defined way as a function of the dynamic characteristics of the machine so that no natural oscillations of the machine will be induced by the nominal position values transmitted to the position control loop. In the above example, for this purpose the filtering time interval $T_F$ was in particular kept constant to attain a desired filtering action with a reduced number of filter coefficients $n_{Koeff}$; to that end, the interpolator clock duration $T_{IPO}$ was correspondingly increased, or the interpolator clock rate $f_{IPO}$ was reduced.

According to the present invention, it has now been recognized that the same filtering action can also be attained with a markedly less expensive nominal position value filter. To that end, a nominal position value filter with a number of $n_{Koeff}$=32 filter coefficients is used, but at the same time the interpolator clock duration $T_{IPO}$ is increased to $T_{IPO}$=6 ms. Since only 32 filter coefficients of the nominal position value filter have to be calculated, the required filtering calculation time $t_{cal}$ needed for the purpose is reduced or halved to $t_{cal}$=100 µs. Hence in this case, with a total of only 32 filter coefficients and correspondingly less calculation effort and expense, the same filtering action can be attained (see FIG. 2b) as before with a total of 64 filter coefficients. In the final analysis, this is achieved because along with the nominal position value filter, the interpolator clock rate $T_{IPO}$ is also set in a defined way as a function of the dynamic characteristics of the machine so that no natural oscillations of the machine will be induced by the nominal position values transmitted to the position control loop. In the above example, for this purpose the filtering time interval $T_F$ was in particular kept constant to attain a desired filtering action with a reduced number of filter coefficients $n_{Koeff}$; to that end, the interpolator clock duration $T_{IPO}$ was correspondingly increased, or the interpolator clock rate $f_{IPO}$ was reduced.

According to the present invention, along with or as a supplement to the nominal position value filter 2, the interpolator clock rate $f_{IPO}$ or the interpolator clock duration $T_{IPO}$ is now set as a function of the dynamic characteristics of the machine, in such a way that no natural oscillations of the machine are induced by the command variables or nominal position values transmitted to the position control loop 4. The appropriate procedure according to the present invention will now be explained in terms of a simple example.

According to the present invention, it is accordingly recognized in general that for a preset interpolator clock duration $T_{IPO}$, a nominal position value filter required for a defined filtering action, with $n_{Koeff}$ filter coefficients, can be replaced by a nominal position value filter with $n_{Koeff}$=$n_{Koeff}$/p filter coefficients (p=2, 3, . . . ), if a modified interpolator clock duration $T_{IPO}$ is selected, in accordance with $T_{IPO}$=p*$T_{IPO}$. The interpolator clock rate $f_{IPO}$ is also accordingly set as a function of the applicable dynamic characteristics of the machine, so that the filtered nominal position values transmitted to the position control loop will not induce any natural oscillations of the machine.

If in the procedure of the present invention, based for instance on a low resonant frequency $f_{RES}$ of the machine, resonant frequencies of the machine are induced at rapid changes of position, then there is no need for the interpolator unit 1 to ascertain nominal position values or scanned values of the path curve at a high interpolator clock rate $f_{IPO}$. To avoid natural oscillations of the machine that cause considerable path deviations, these scanned values are already smoothed in the nominal position value filter 2. The interpolator clock rate $f_{IPO}$ can thus be reduced, and the calculation capacity thus liberated can be available for other applications for control purposes, without thereby causing additional path deviations.

In the reverse case, where the machine has a high resonant frequency $f_{RES}$ or a large linear frequency range, the possibility exists of increasing the interpolator clock rate $f_{IPO}$. This makes it possible to operate a machine correspondingly more dynamically, which in turn means shorter machining times.

The low-pass filtered train of nominal position values is then, in the present example, transmitted to the fine interpolator 3. In the fine interpolator 3, nominal position values are produced in the time pattern of the closed loop position control and are then transmitted to the position controller 4.

The number k of nominal position values to be additionally ascertained in the fine interpolator 3 is found from the ratio of the interpolator clock rate $f_{IPO}$ and the position control clock rate $f_{LR}$; that is, k=$f_{IPO}$/$f_{LR}$. Taking into account the least possible calculation effort and expense, the interpolator clock duration $T_{IPO}$ is advantageously selected to be an integral multiple of the position control clock duration $T_{LR}$. This assures that an integral number k of additional scanned values ascertained by the fine interpolator 3 will be located between two scanned values of the path curve ascertained in the interpolator unit 2.

The position controller 4 will not be described in detail here; it can for instance be part of a known cascaded closed loop control structure for a machine tool or for a robot.

Within the scope of the present invention, as explained, knowledge of defined dynamic characteristics of the machine is necessary, and in particular knowledge of the lowest applicable resonant frequency $f_{RES}$ of the machine. Ascertaining the resonant frequency $f_{RES}$ can be done automatically, at the instigation of the user, by the control system. Alternatively, the lowest resonant frequency $f_{RES}$ of the machine can also be predetermined by the user. The value for the lowest resonant frequency $f_{RES}$ of the machine is then stored in a memory of the control system, which the control system can access as needed.

In regular operation, the dynamic characteristics of the machine are evaluated. In an NC program for controlling a numerically continuous-path controlled machine tool, as soon as a command appears that causes a path motion of the machine, this motion is split among the machine axes, along which the servomotors make motion of machine components possible. For each servomotor, a calculation is thus done in the interpolator unit of the points on the path curve that are preset to the closed loop position controller of the individual servomotors as command variables or nominal position values. Ascertaining the nominal position values is done in the interpolator unit 1, at the interpolator clock rate $f_{IPO}$, which as explained is set as a function of the dynamic characteristics of the machine, or in other words especially as a function of the lowest resonant frequency.

The spectrum of the train of scanned values of the path curve that are calculated by the interpolator unit 1 can, for an essentially steady motion, for the most part have low-frequency components, or in a nonsteady motion for the most part have high-frequency components. If high-frequency components that are in the range of the resonant frequency of the machine are present, these frequency components have to be damped or filtered, so as not to induce natural oscillations of the machine.

First, this damping is affected by providing that the interpolator unit 1 produces a corresponding speed profile for the path curve. By Shannon's theorem, the scanning frequency must be selected to be at least twice as high as the maximum frequency in the spectrum of the scanned path curve. If for instance the resonant frequency $f_{RES}$ of the machine is used for scanning the path curve in the interpolator unit 1, then the scanned values of the interpolator unit 1 that are output have frequency components up to at most half the resonant frequency of the machine. It is appropriate to keep a certain distance between the resonant frequency of the machine and the maximum frequency of the signal spectrum, since the types of machine currently in use have not a narrow resonant frequency $f_{RES}$, but a resonant frequency band $\Delta f_{RES}$, within which induced natural oscillations of the machine can occur.

As already briefly explained, it is advantageous to select the interpolator clock duration $T_{IPO}$ as an integral multiple of the position control clock duration $T_{LR}$. However, this is on the condition that the scanning at the interpolator clock rate $f_{IPO}$ cannot be done at an arbitrary frequency but instead is limited to integral multiples of the position control clock rate $f_{LR}$. To assure processing at maximum speed, the next higher interpolator clock rate $f_{IPO}$ is selected in the interpolator unit 1.

To achieve the most precise possible limitation of the spectrum of the train of scanned values to the maximum frequency still allowable for a given machine, an additional nominal position value filtering is necessary. In the final analysis, this achieves a further damping, which enables a more-precise limitation of the maximum allowable frequency of the spectrum of the train of scanned values to frequencies below the resonant frequency $f_{RES}$ or the useful frequency $f_N$ of the machine, by a low-pass filtering.

For nominal position value filtering, it is provided in a first, preferred variant, that the unit 2a be embodied as a calculation unit, in which filter coefficients are calculated individually.

Alternatively, it would also be possible to store a plurality of sets of filter coefficients for various resonant frequencies $f_{RES}$ in memory in a unit 2a, embodied as a memory unit and associated with the nominal position value filter 2. If a plurality of sets of filter coefficients, for instance, are stored in the memory unit 2a, then the particular required set of filter coefficients can be identified unambiguously, since an identification variable ID, which is the quotient of the resonant frequency $f_{RES}$ of the machine and the interpolator clock rate $f_{IPO}$, or in other words ID=$f_{RES}/f_{IPO}$, is assigned to each set of filter coefficients in the memory unit 2a.

Once signal components in the spectrum of the nominal position values that could cause natural oscillations of the machine have been eliminated, it is also necessary, in the present example, for nominal position values for closed loop position control to be furnished at the position control clock rate $f_{LR}$ by a fine interpolation. As already explained, the interpolator clock rate $f_{IPO}$ is advantageously selected to be an integral multiple of the position control clock rate $f_{LR}$. This assures that an integral multiple of the position control clock duration $T_{LR}$ will be located between two furnished scanned values of the interpolator unit 1, so that by the quotient of the interpolator clock rate $f_{IPO}$ and the position control clock rate $f_{LR}$, the number of interpolations to be performed in the fine interpolator 3 can be given in the form of an integer.

Besides the exemplary embodiment explained here, it is understood that still other possibilities for embodying the present invention exist as well.

What is claimed is:

1. A method for generating nominal position values for a position control loop of a numerically continuous-path controlled machine, comprising:

presetting nominal position values with a defined interpolator clock rate;

digitally filtering said preset nominal position values; and transmitting said digitally filtered nominal position values to a position control loop, which with them controls motion of a machine on a path curve at a defined position control clock rate;

adjusting said digitally filtering nominal position values as a function of dynamic characteristics of said machine; and adjusting an interpolator clock rate as a function of said dynamic characteristics of said machine.

2. The method of claim 1, wherein said dynamic characteristic of said machine comprises a lowest resonant frequency of said machine.

3. The method of claim 1, wherein said adjusting of said interpolator clock rate is based in part on a position control clock rate, and said interpolator clock rate is selected as an integral fraction of said position control clock rate.

4. The method of claim 1, further comprising fine interpolating said digitally filtered preset nominal position values before said transmission to a position control loop.

5. The method of claim 4, further comprising transmitting said fine interpolated digital filtered nominal position values to said position control loop at said position control clock rate.

6. The method of claim 2, further comprising calculating a filter set with filter coefficients for a defined resonant frequency and a set interpolator clock rate.

7. The method of claim 2, further comprising storing a filter set with filter coefficients for a defined resonant frequency and a set interpolator clock rate.

8. A circuit arrangement for generating nominal position values for a position control loop of a numerically continuous-path controlled machine, comprising:

an interpolator unit for presetting nominal position values with a defined interpolator clock rate;

a nominal position value filter for digital filtration of said nominal position values preset by said interpolator unit;

a position control loop, which processes said digitally filtered nominal position values in such a way that by way of them a motion of a machine on a path curve is controllable at a defined position control clock rate, wherein along with said nominal position value filter, said interpolator clock rate is also adjusted as a function of dynamic characteristics of said machine.

9. The circuit arrangement of claim 8, wherein said nominal position value filter comprises a FIR filter, by way of which a low pass filtration results.

10. The circuit arrangement of claim 8, wherein said nominal position value filter comprises a memory unit, in which different filter coefficient sets for different machine resonant frequencies are stored in said memory unit, which each serve as a dynamic characteristic for setting said interpolator clock rate.

11. The circuit arrangement of claim 8, wherein said nominal position value filter comprises a calculation unit for calculating filter coefficient sets for an applicable resonant frequency of said machine, which serves as a dynamic characteristic for setting said interpolator clock rate.

12. The circuit arrangement of claim 8, further comprising a fine interpolator disposed between said nominal position value filter and said position control loop, wherein said fine interpolator performs a fine interpolation of said nominal position values.

13. The circuit arrangement of claim 12, wherein said fine interpolator transmits nominal position values at said position control clock rate to said position control loop.

* * * * *